United States Patent
Seok

(10) Patent No.: US 9,635,614 B2
(45) Date of Patent: *Apr. 25, 2017

(54) POWER MANAGEMENT METHOD FOR STATION IN WIRELESS LAN SYSTEM AND STATION THAT SUPPORTS SAME

(71) Applicant: LG ELECTRONICS INC., Seoul (KR)

(72) Inventor: Yong Ho Seok, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/720,537

(22) Filed: May 22, 2015

(65) Prior Publication Data

US 2015/0257105 A1     Sep. 10, 2015

Related U.S. Application Data

(63) Continuation of application No. 13/871,875, filed on Apr. 26, 2013, now Pat. No. 9,078,209, which is a
(Continued)

(51) Int. Cl.
 *G08C 17/00*     (2006.01)
 *H04W 52/02*    (2009.01)
(Continued)

(52) U.S. Cl.
 CPC ....... *H04W 52/0235* (2013.01); *H04W 52/02* (2013.01); *H04W 84/12* (2013.01); *H04W 88/08* (2013.01); *Y02B 60/50* (2013.01)

(58) Field of Classification Search
 CPC ............ H04W 52/02; H04W 52/0235; H04W 52/0219; H04W 52/0229; H04W 76/023;
(Continued)

(56) References Cited

U.S. PATENT DOCUMENTS 7,508,781 B2   3/2009  Liu et al.
7,551,948 B2   6/2009  Meier et al.
(Continued)

FOREIGN PATENT DOCUMENTS

| KR | 10-2008-0113908 | 12/2008 |
| WO | 2005-011132 | 2/2005 |
| WO | 2009/064113 | 5/2009 |

OTHER PUBLICATIONS

IP Australia Application Serial No. 2010269280, Notice of Allowance dated Aug. 14, 2013, 2 pages.
(Continued)

*Primary Examiner* — Ian N Moore
*Assistant Examiner* — Phong La
(74) *Attorney, Agent, or Firm* — Lee Hong Degerman Kang Waimey

(57) ABSTRACT

A method performed by an access point (AP) that includes: receiving, by the AP from a second station, an information request frame for requesting whether or not a wakeup schedule is established between the AP and a first station; and transmitting, by the AP to the second station, an information response frame including a first wakeup schedule element in response to the information request frame. If the AP has an established wakeup schedule with the first station, the first wakeup schedule element includes information about the establish wakeup schedule, and if the AP has no established wakeup schedule with the first station, a length of the first wakeup schedule element is set to zero by the AP. The method also includes transmitting, by the AP to the second station, an unsolicited information response frame when the AP updates the first station's wakeup schedule.

6 Claims, 5 Drawing Sheets

Related U.S. Application Data continuation of application No. 13/124,655, filed as application No. PCT/KR2010/004499 on Jul. 9, 2010, now Pat. No. 8,451,761.

(60) Provisional application No. 61/224,063, filed on Jul. 9, 2009.

(51) Int. Cl.
*H04W 84/12* (2009.01)
*H04W 88/08* (2009.01)

(58) Field of Classification Search
CPC .... H04W 88/08; H04W 84/12; H04L 1/1628; H04L 67/325
See application file for complete search history.

(56) References Cited

U.S. PATENT DOCUMENTS

| | | | |
|---|---|---|---|
| 7,881,322 B1 | 2/2011 | Benveniste | |
| 8,208,391 B2 | 6/2012 | Gurney et al. | |
| 8,806,246 B1* | 8/2014 | Wu | G06F 9/4893 455/205 |
| 2004/0190467 A1* | 9/2004 | Liu | H04W 52/0216 370/311 |
| 2005/0018624 A1* | 1/2005 | Meier | H04L 29/12028 370/318 |
| 2006/0089138 A1 | 4/2006 | Smith et al. | |
| 2006/0285526 A1 | 12/2006 | Jang et al. | |
| 2008/0232287 A1* | 9/2008 | Shao | H04W 52/0216 370/311 |
| 2009/0042553 A1* | 2/2009 | Lavi | H04W 52/0216 455/419 |
| 2009/0138738 A1* | 5/2009 | Chen | G06F 1/3203 713/323 |
| 2009/0141662 A1* | 6/2009 | Gurney | H04W 52/0229 370/311 |
| 2009/0196210 A1* | 8/2009 | Desai | H04W 52/0225 370/311 |
| 2009/0196212 A1* | 8/2009 | Wentink | H04W 52/0235 370/311 |
| 2009/0268652 A1* | 10/2009 | Kneckt | H04W 52/0235 370/311 |
| 2010/0008274 A1 | 1/2010 | Kneckt et al. | |
| 2010/0014458 A1 | 1/2010 | Singh et al. | |
| 2010/0061284 A1 | 3/2010 | Chen et al. | |
| 2010/0138549 A1* | 6/2010 | Goel | H04W 52/0225 709/228 |
| 2010/0165896 A1* | 7/2010 | Gong | H04W 52/0216 370/311 |
| 2010/0214967 A1 | 8/2010 | Moelard et al. | |
| 2011/0194519 A1* | 8/2011 | Habetha | H04L 5/1438 370/329 |
| 2011/0305215 A1* | 12/2011 | Hofmann | H04W 52/0216 370/329 |
| 2013/0064155 A1 | 3/2013 | Sohrabi | |
| 2015/0237578 A1* | 8/2015 | Gogate | H04W 52/0235 370/311 |

OTHER PUBLICATIONS

Canadian Intellectual Property Office Application Serial No. 2,767,413, Office Action dated Nov. 21, 2013, 4 pages.
Torsten Braun et al., "Power Saving in Wireless Ad hoc Networks Without Synchronization", Mar. 2005, 4 pages.

\* cited by examiner

POWER MANAGEMENT METHOD FOR STATION IN WIRELESS LAN SYSTEM AND STATION THAT SUPPORTS SAME

CROSS-REFERENCE TO RELATED APPLICATIONS

This application is a continuation of U.S. patent application Ser. No. 13/871,875, filed on Apr. 26, 2013, now U.S. Pat. No. 9,078,209, which is a continuation of U.S. application Ser. No. 13/124,655, filed on Apr. 15, 2011, now U.S. Pat. No. 8,451,761, which is the National Stage filing under 35 U.S.C. 371 of International Application No. PCT/KR2010/004499, filed on Jul. 9, 2010, which claims the benefit of U.S. Provisional Application No. 61/224,063, filed on Jul. 9, 2009, the contents of which are all hereby incorporated by reference herein in their entirety.

TECHNICAL FIELD

The present invention relates to wireless communications, and more particularly, to a power management method of a station in a wireless local area network (WLAN) system and the station supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data rate to up to 54 Mbps by using the OFDM technology. Disadvantageously, however, the IEEE 802.11a has a shorter communication distance than the IEEE 802.11b. Similarly to the IEEE 802.11b, the IEEE 802.11g implements the data rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

A basic access mechanism of an IEEE 802.11 medium access control (MAC) mechanism is a carrier sense multiple access with collision avoidance (CSMA/CA) combined with binary exponential backoff. The CSMA/CA mechanism is also referred to as a distributed coordinate function (DCF) of the IEEE 802.11 MAC, and basically employs a "listen before talk" access mechanism. In this type of access mechanism, a station (STA) listens a wireless channel or medium before starting transmission. As a result of listening, if it is sensed that the medium is not in use, a listening STA starts its transmission. Otherwise, if it is sensed that the medium is in use, the STA does not start its transmission but enters a delay period determined by the binary exponential backoff algorithm.

The CSMA/CA mechanism also includes virtual carrier sensing in addition to physical carrier sensing in which the STA directly listens the medium. The virtual carrier sensing is designed to compensate for a limitation in the physical carrier sensing such as a hidden node problem. For the virtual carrier sending, the IEEE 802.11 MAC uses a network allocation vector (NAV). The NAV is a value transmitted by an STA, currently using the medium or having a right to use the medium, to anther STA to indicate a remaining time before the medium returns to an available state. Therefore, a value set to the NAV corresponds to a period reserved for the use of the medium by an STA transmitting a corresponding frame.

One of procedures for setting the NAV is a exchange procedure of a request to send (RTS) frame and a clear to send (CTS) frame. The RTS frame and the CTS frame include information capable of delaying frame transmission from receiving STAs by reporting upcoming frame transmission to the receiving STAs. The information may be included in a duration filed of the RTS frame and the CTS frame. After performing the exchange of the RTS frame and the CTS frame, a source STA transmits a to-be-transmitted frame to a destination STA.

The WLAN system does not require a node of a specific point to access a network, and thus advantageously can support mobility of the STA. To support the mobility, most STAs operate by using batteries. However, battery capacity is limited. Accordingly, there is a need for a method of managing power of an STA by saving power consumption of the STA so that the STA can operate for a long time with limited battery capacity while preventing network accessibility from being impaired due to the limited battery capacity.

SUMMARY OF INVENTION

Technical Problem

The present invention provides a power management method capable of saving power consumption of a station (STA) and also provides the STA supporting the method.

Technical Solution

According to an aspect of the present invention, there is provided a power management method of an STA. The method includes: transmitting to an access point (AP) a power save configuration (PSC) request frame for reporting that the STA intends to transition to a power save (PS) mode; receiving from the AP a PSC response frame in response to the PSC request frame; and after receiving the PSC response frame, entering the PS mode.

In the aforementioned aspect of the present invention, the PSC request frame may include a wakeup schedule for indicating a period in which the STA operates in a wakeup state.

In addition, the PSC request frame may include a power management (PM) field, and the PM field may be set to 1.

In addition, the PSC response frame may include a status code field to indicate that the AP successfully receives the PSC request frame.

According to another aspect of the present invention, there is provided a power management method of an STA. The method includes: receiving from an AP an information response frame including a wakeup schedule of a destination STA which is a target of frame transmission; and transmitting to the destination STA a data frame according to the wakeup schedule.

In the aforementioned aspect of the present invention, the information response frame may be transmitted in response to an information request frame for requesting transmission of the information response frame.

In addition, the information request frame may have a target address set to a medium access control (MAC) address of the destination STA, and may include a request information element for indicating the wakeup schedule of the destination STA.

In addition, the information response frame may include a requested information element field, and the requested information element field may include a wakeup schedule information element of the destination STA.

In addition, the wakeup scheduling information element may include a length field indicating a length of the wakeup schedule information element, a start time field indicating a start time at which the destination STA initially operates in a wakeup state in a beacon interval, and a sleep interval field indicating an interval of a period in which the plurality of destination STAs existing in the beacon interval remain in the wakeup state.

In addition, if the destination STA operates in an active mode, the length field of the wakeup schedule information element of the information response frame may be set to 0.

According to another aspect of the present invention, there is provided a power management method of an STA, performed by an AP, in a WLAN system. The method includes: receiving a PSC request frame including a wakeup schedule of a first STA from the first STA coupled to the AP and an information response frame from a PBSS control point (PCP); receiving from a second STA an information request frame for requesting the wakeup schedule of the first STA; and transmitting an information response frame including the wakeup schedule of the first STA in response to the information request frame.

Advantageous Effects

An effective power management method of a station (STA) constituting a wireless local area network (WLAN) system is provided to save power consumption of the STA.

MODE FOR INVENTION

Hereinafter, embodiments of the present invention will be described in detail with reference to the accompanying drawings.

Figure 1:
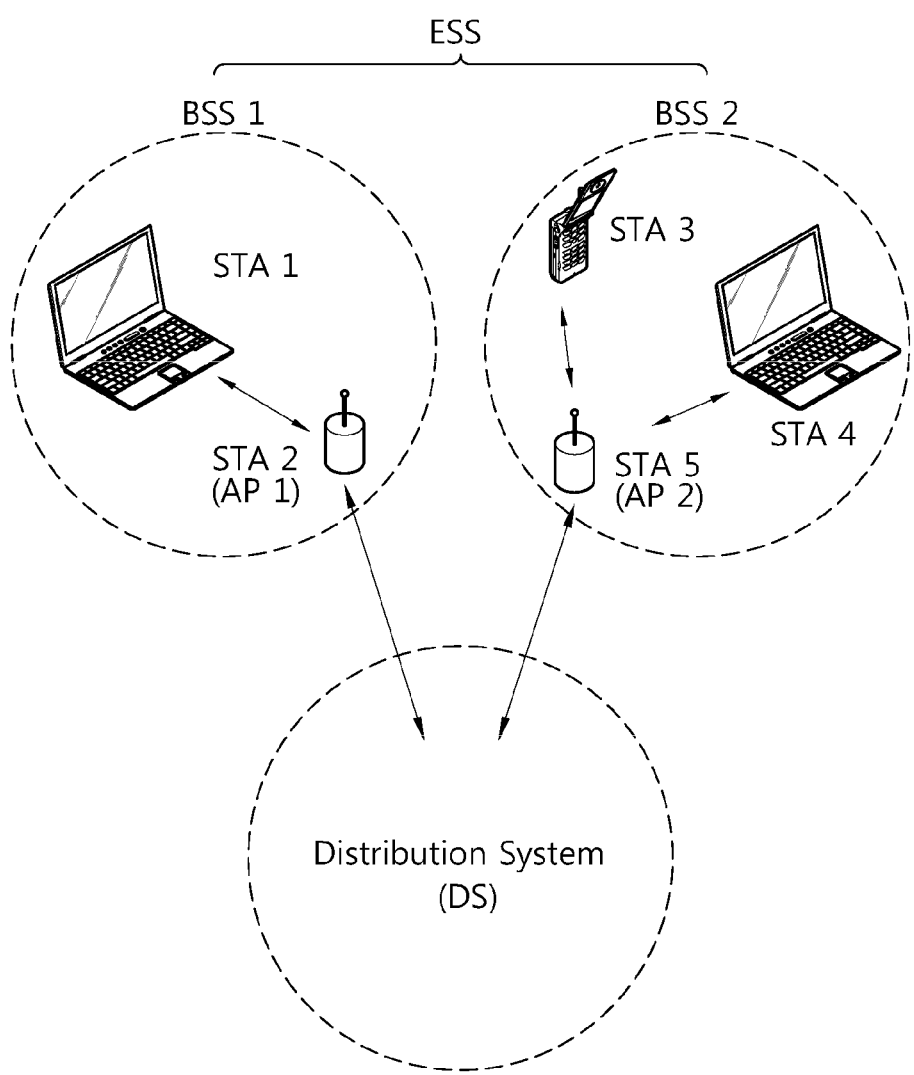
FIG. 1 is a schematic view showing an exemplary structure of a wireless local area network (WLAN) system according to an embodiment of the present invention.

FIG. 1 is a schematic view showing an exemplary structure of a wireless local area network (WLAN) system according to an embodiment of the present invention.

Referring to FIG. 1, the WLAN system includes one or more basis service sets (BSSs). The BSS is a set of stations (STAs) which are successfully synchronized to communicate with one another, and is not a concept indicating a specific region.

The BSS can be classified into an infrastructure BSS and an independent BSS (IBSS). The infrastructure BSS is shown in FIG. 1. Infrastructure BSSs (i.e., BSS1 and BSS2) include one or more STAs (i.e., STA1, STA3, and STA4), access points (APs) which are STAs providing a distribution service, and a distribution system (DS) connecting a plurality of APs (i.e., AP1 and AP2). On the other hand, the IBSS does not include APs, and thus all STAs are mobile STAs. In addition, the IBSS constitutes a self-contained network since access to the DS is not allowed.

A personal BSS (PBSS) is one type of an IEEE 802.11 LAN ad-hoc network similar to the IBSS. STAs of the PBSS are directly connected to each other, and thus can communicate with each other. However, unlike the IBSS, a PBSS control point (PCP) served as a coordinator of the BSS is present in the PBSS. The PCP is an STA served as a coordinator in the PBSS. The PCP takes charge of transmission of a beacon frame without the aid of other elements, and allocates a service period and a contention-based period.

The STA is an arbitrary functional medium including a medium access control (MAC) and wireless-medium physical layer interface conforming to the IEEE 802.11 standard, and includes an AP, a PCP, a non-AP STA, a non-PCP STA in a broad sense. Further, an STA including a transceiver operating at 60 MHz is referred to as a millimeter (mm) wave STA (mSTA).

The STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP/non-PCP STA are portable terminals operated by users. The non-AP/non-PCP STA may be simply referred to as an STA. The non-AP/non-PCP STA may also be referred to as a terminal, a wireless transmit/receive unit (WTRU), a user equipment (UE), a mobile station (MS), a mobile terminal, a mobile subscriber unit, etc. In the following descriptions, the STA represents the non AP/non-PCP STA unless otherwise specified.

The AP (i.e., AP1 and AP2) is a functional entity for providing access to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical construction for interconnecting APs.

In one power management method of an STA supporting the IEEE 802.11 standard, a power state of the STA may be chosen from an awake state and a doze state. The awake state is a state in which the STA is fully powered to enable all functions including transmission/reception. The doze state is a state in which the STA consumes low power by limiting transmission/reception functions.

A power management mode of the STA includes an active mode and a power save (PS) mode. In the active mode, the STA operates in the awake state. In the PS mode, the STA may optionally transition between the awake state and the doze state to save power consumption. When the STA operates in the PS mode, the STA can enter the awake state any time.

In the PS mode, the STA can transition between the two states to minimize power consumption. That is, when the STA does not transmit/receive data or the like to/from an AP or another STA, the STA chooses the doze state to minimize power consumption. If transmission of the data or the like is necessary or if reception of the data or the like is requested, the STA enters the awake state to transmit/receive the data or the like and then returns to the doze state after completion of transmission/reception.

While operating in the active mode, the STA may transmit to the AP a frame in which a power management (Pwr Mgt) bit of a frame control field included in a MAC header of the frame is set to 1, and thus may report to the AP that the STA transitions to the PS mode. The AP cannot transmit the frame to the STA operating in the PS mode. However, the AP can buffer a frame to be transmitted so that the frame is transmitted at a predetermined time.

Figure 2:
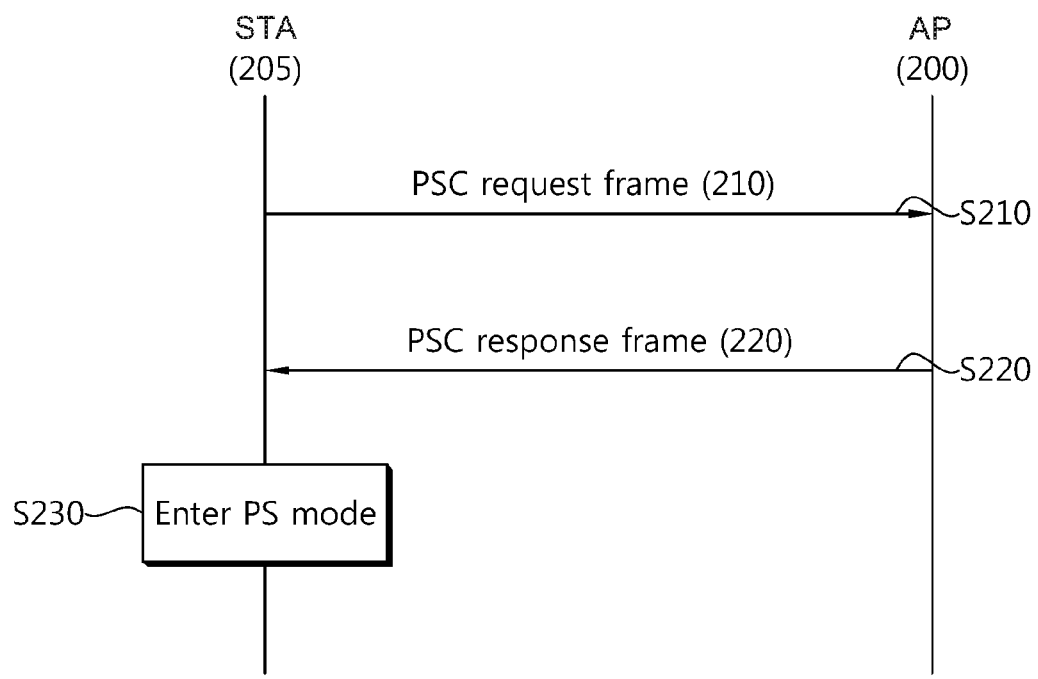
FIG. 2 shows a message flow for a power management method of a station (STA) according to an embodiment of the present invention.

FIG. 2 shows a message flow for a power management method of an STA according to an embodiment of the present invention.

A procedure in which a specific STA enters a power save (PS) mode is shown in FIG. 2. In the example of FIG. 2, before entering the PS mode, an STA 205 which intends to enter the PS mode transmits a power save configuration (PSC) request frame 210 to an AP 200 to report that the STA 205 will enter the PS mode (step S210).

Upon receiving the PSC request frame 210, the AP 200 transmits a PSC response frame 220 to the STA 205 as a response (step S220).

Upon receiving the PSC response frame 220, the STA 205 enters the PS mode (step S230).

Table 1 shows an example of information included in a frame body of the PSC request frame 210.

TABLE 1

| Order | Information |
|---|---|
| 1 | Category |
| 2 | Action |
| 3 | Power Management (PM) |
| 4 | Wakeup Schedule Element |

The PSC request frame 210 includes a category field, an action field, and a power management (PM) field, and optionally includes a wakeup schedule element field. Herein, the field name or order is shown for exemplary purposes, and thus a new field may be added or the order may be modified if necessary.

The category field and the action field briefly show a category and action of a specific frame. That is, these fields may indicate that the frame is related to PSC and is a control signal for requesting the PSC. An action field value of the PSC request frame may be set to 2.

The PM field indicates a specific mode to which the STA transmitting the PSC request frame intends to transition. The STA intending to enter the PS mode transmits to the AP the PSC request frame by setting the PM field value of the PSC request frame to 1. When the STA operating in the PS mode intends to enter the active mode, the PM field value of the PSC frame may be set to 0. The PM field may have a length of one octet.

Since the example of FIG. 2 shows a case where the STA 205 intends to enter the PS mode while operating in the active mode, the PM field value of the PSC request frame 210 transmitted by the STA 205 to the AP 200 is set to 1.

The wakeup schedule element field contains a wakeup schedule of the STA transmitting the PSC request frame. If the PSC request frame is transmitted by including the wakeup schedule element field, the AP can obtain the wakeup schedule of the STA transmitting the PSC request frame by using the wakeup schedule element field. The AP may report the wakeup schedule of the STA to another STA which requires the wakeup schedule of the STA. A detailed procedure related thereto will be described below in greater detail according to other embodiments.

Figure 3:
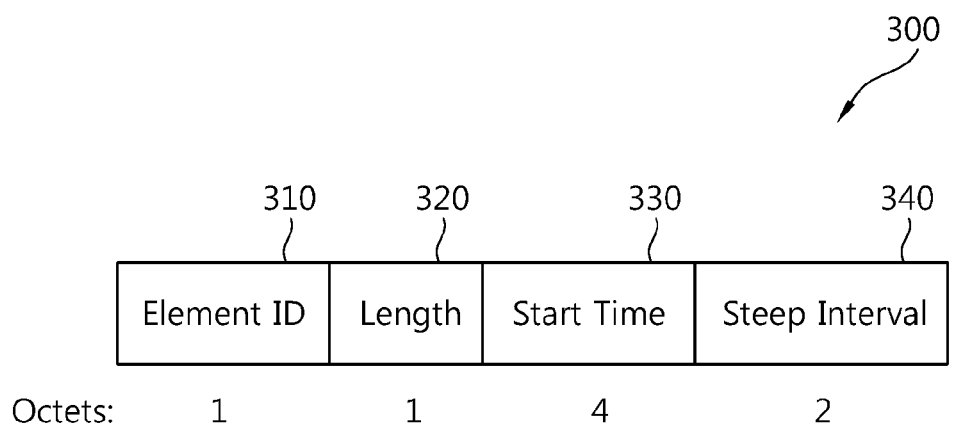
FIG. 3 is a diagram showing an exemplary format of a wakeup schedule element according to an embodiment of the present invention.

FIG. 3 is a diagram showing an exemplary format of a wakeup schedule information element (IE) according to an embodiment of the present invention.

A wakeup schedule IE 300 includes an element identifier (ID) field 310, a length field 320, a start time field 330, and a sleep interval field 340.

The element ID field 310 includes information for identifying an information element. The length field 320 indicates a length of the wakeup schedule IE.

The start time field 330 indicates a start time at which an STA initially operates in the awake state in a beacon interval (BI). While operating in a PS mode, the STA can repetitively transition between the awake state and the doze state. If a period in which the STA operates in the awake state in the BI is defined as an awake BI (A-BI), the start time field 330 may indicate a first A-BI start time.

The sleep interval field 340 indicates a period in which the STA is in the awake state and which may exist in plural number in the BI, that is, indicates an interval of the aforementioned A-BI interval.

In the example of FIG. 2, the AP 200 can know a period in which the STA 205 operates in the awake state by using the wakeup schedule element field of the PSC request frame 210 received from the STA 205. Accordingly, the AP 200 can buffer a frame to be transmitted to the STA 205 so that the buffered frame is transmitted when the STA 205 operates in the awake state.

Table 2 shows an example of information included in a frame body of the PSC response frame 220.

TABLE 2

| Order | Information |
|---|---|
| 1 | Category |
| 2 | Action |
| 3 | Status Code |
| 4 | Wakeup Schedule Element |

The PSC response frame 220 includes a category field, an action field, and a status code field, and optionally includes a wakeup schedule element field. Herein, the field name or order is shown for exemplary purposes, and thus a new field may be added or the order may be modified if necessary.

The category field and the action field briefly show a category and action of a specific frame. That is, these fields may indicate that the frame is related to PSC and is a control signal for responding to the PSC. An action field value of the PSC response frame may be set to 3.

The status code field includes a response of the AP 200 for the PSC request of the STA transmitting the PSC request frame 210. The AP may indicate that the AP can successfully enter the PS mode, or may indicate that a new wakeup schedule is proposed while rejecting its wakeup schedule proposed by the STA 205.

The wakeup schedule field includes a wakeup schedule element. As a format of the wakeup schedule element, a format of the wakeup schedule element included in the PSC request frame may be used. The AP 200 may propose a new wakeup schedule for the STA 205 when the PSC request frame 210 transmitted by the STA 205 does not include the wakeup schedule or when the STA 205 rejects the wakeup schedule transmitted using the PSC request frame 210.

Figure 4:
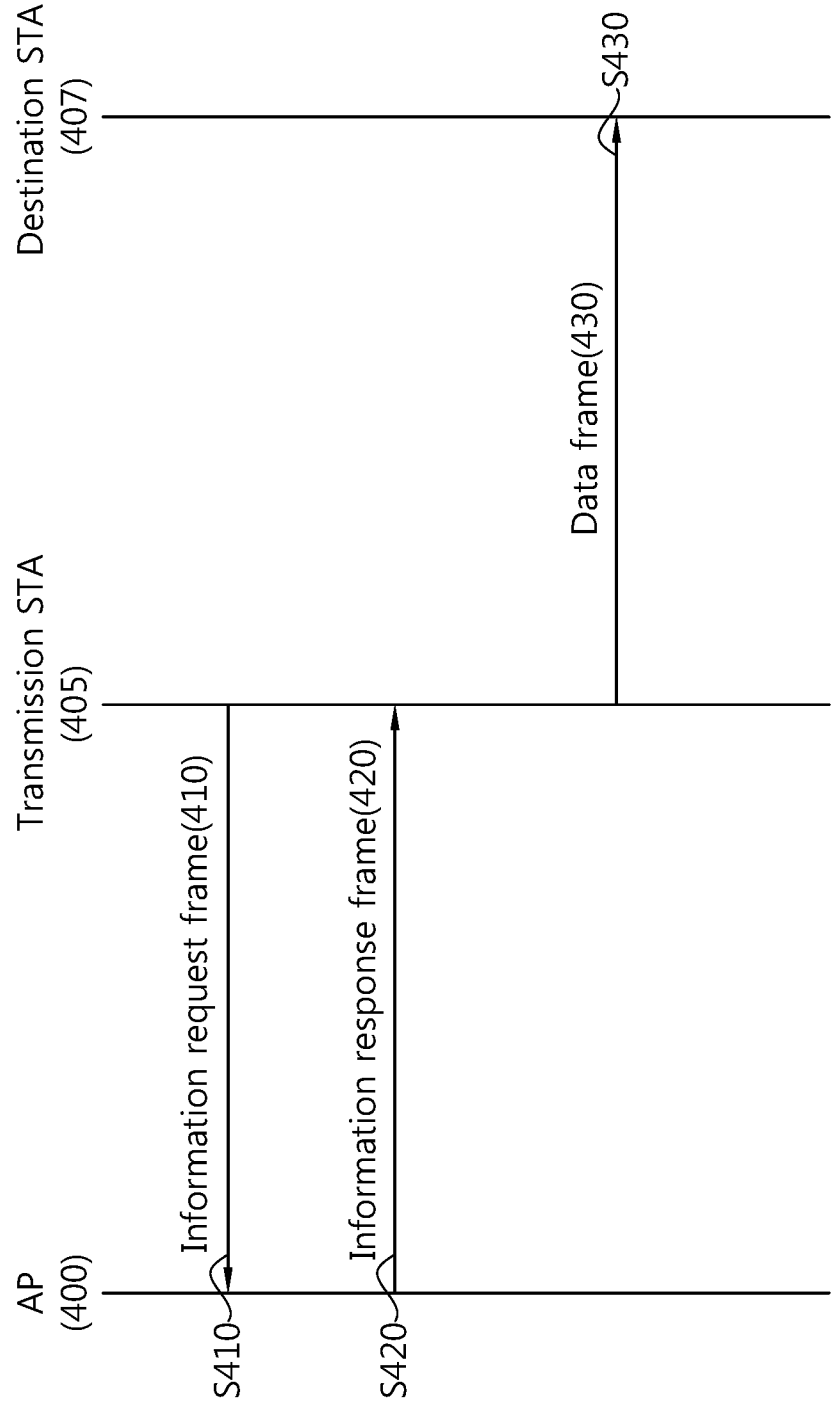
FIG. 4 shows a message flow for a frame transmission procedure according to an embodiment of the present invention.

FIG. 4 shows a message flow for a frame transmission procedure according to an embodiment of the present invention.

A transmission STA 405 intending to transmit a frame to a destination STA 407 has to know a wakeup schedule of the destination STA 407 before transmission of the frame. As described above, when the destination STA 407 is operating in the PS mode, the transmission STA 405 cannot arbitrarily transmit the frame to the destination STA 407. When the transmission STA 405 buffers the frame to be transmitted to the destination STA 407, the transmission STA 405 transmits an information request frame 410 to an AP 400 to obtain the wakeup schedule of the destination STA 407 (step S410).

In response to the information request frame, the AP 400 transmits to the transmission STA 405 an information response frame 420 including wakeup schedule information of the destination STA 407 (step S420).

The transmission STA 405 obtains the wakeup schedule of the destination STA 407 from the information response frame 420, and can transmit a data frame 430 when the destination STA 407 operates in the awake state (step S430).

Table 3 shows an example of information included in a frame body of the information request frame 410.

TABLE 3

| Order | Information |
|---|---|
| 1 | Category |
| 2 | Action |
| 3 | Target Address |
| 4 | Request Information element |

The information request frame 410 includes a category field, an action field, a target address field, and a request information element field. Herein, the field name or order is shown for exemplary purposes, and thus a new field may be added or the order may be modified if necessary.

The category field and the action field briefly show a category and action of a specific frame. That is, these fields may indicate that the frame is a management action frame for requesting the wakeup schedule information. An action field value of the PSC response frame may be set to 4.

The target address field includes information indicating the destination STA 407 of which the wakeup schedule is intended to be known by the transmission STA 405. The information indicating the destination STA 407 may be a MAC address or an association ID (AID) of the destination STA 407.

The AP 400 may evaluate the target address field to know the destination STA 407 of which the wakeup schedule is intended to be known by the transmission STA 405, and may report the wakeup schedule of the destination STA 407 to the destination STA 407 by using the information response frame 420. When the target address field is set to a broadcast address when it is transmitted to the AP 400, the AP 400 may report the wakeup schedule of all STAs in a BSS to the transmission STA 405 by using the information response frame 420.

The request information element field includes information indicating an information element requested using the information request frame 410. In the example of FIG. 4, the request information element field includes information indicating the request of the wakeup schedule information element. The request information element field may be set to an element ID of the wakeup schedule information element or may be set to an index value indicating the wakeup schedule information element.

The information request frame 410 may be transmitted by further including wakeup schedule information of the transmission STA 405 or another STA's wakeup schedule information known to the transmission STA 405.

The AP may obtain a wakeup schedule from an STA intending to enter the PS mode as shown in FIG. 2, or may obtain another STA's wakeup schedule known to an STA transmitting the information request frame and an STA transmitting the information request frame by using the information request frame. In addition, the AP may manage wakeup schedules of all STAs in the BSS according to a method of regulating the wakeup schedules of the STAs in the BSS by using a PSC response frame or an information response frame.

Table 4 shows an example of information included in a frame body of the information response frame 420.

TABLE 4

| Order | Information |
|---|---|
| 1 | Category |
| 2 | Action |
| 3 | Target Address |
| 4 | Requested Information element |

The information response frame 420 includes a category field, an action field, a target address field, and a request information element field. Herein, the field name or order is shown for exemplary purposes, and thus a new field may be added or the order may be modified if necessary.

The category field and the action field briefly show a category and action of a specific frame. That is, these fields may indicate that the frame is a management action frame for responding to the request of the wakeup schedule information. An action field value of the PSC response frame may be set to 5.

The target address field may directly use a value which is set in the target address field of the information request frame 410. Alternatively, the target address field may include information indicating a specific STA of which a wakeup schedule corresponds to a wakeup schedule transmitted using the request information element field.

The requested information element field includes an information element requested using the information request frame 410. In the example of FIG. 4, the requested information element field is a wakeup schedule information element of an STA indicated by the target address field. Therefore, the requested information element field of the information response frame 420 includes the wakeup schedule of the STA indicated by the target address field. The format of FIG. 3 may be used as a format of the wakeup schedule information element.

The aforementioned descriptions will now be summarized by taking an example. In the example of FIG. 4, it is assumed that the transmission STA 405 transmits the information request frame to the AP 400 to obtain the wakeup schedule of the destination STA 407. In this case, the target address field of the information request frame 410 is set to a MAC address of the destination STA 407, and the request information element field is set to an index value of the wakeup schedule information element. The information request frame 410 may further include a wakeup schedule of the transmission STA 405 and a wakeup schedule of other STA(s) known to the transmission STA 405.

The AP 400 transmits the information response frame 420 in response to the information request frame 410. In this case, the target address field of the information response frame 420 is set to the MAC address of the destination STA 407. The requested information element field includes a wakeup schedule information element of the destination STA 407. In this case, the format of FIG. 3 can be used as a format of the wakeup schedule information element.

If the destination STA 407 is operating in the active mode, the information response frame 420 is transmitted by setting a length field of a wakeup schedule information element to 0. In this case, the wakeup schedule information element is included in the requested information element field of the information response frame 420.

When the wakeup schedule of the destination STA 407 depends on a conventional wakeup schedule, if the destination STA 407 is modified before starting an operation in the awake state, the AP 400 may transmit a wakeup schedule of the modified (updated) destination STA 407 to the transmission STA 405. In this case, the information response frame transmitted by the AP 400 according to the modification of the wakeup schedule of the destination STA 407 may be transmitted irrespective of the presence of the request of the transmission STA 405, that is, may be transmitted in the absence of the request.

Although the aforementioned embodiments of FIG. 2 and FIG. 4 have been described by taking an example of an operation between an STA and an AP in an infrastructure BSS, the present invention is not limited thereto. Thus, the present invention is equally applicable to a PBSS. The AP of FIG. 2 and FIG. 4 may be a PCP, and the STA may be a non-PCP STA or an mSTA.

Figure 5:
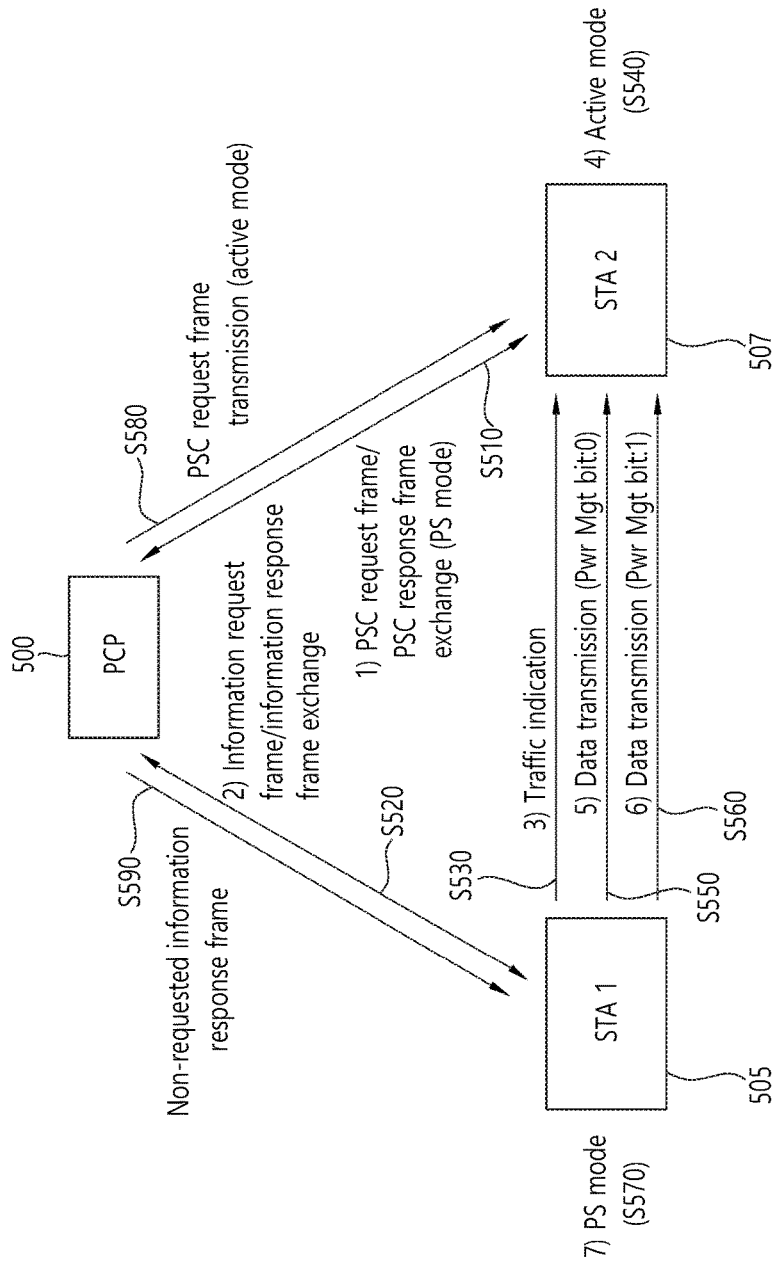
FIG. 5 shows a message flow for a power management method of an STA according to another embodiment of the present invention.

FIG. 5 shows a message flow for a power management method of an STA according to another embodiment of the present invention.

Referring to FIG. 5, an STA2 507 exchanges a PSC request frame and a PSC response frame with a PCP 500 before entering the PS mode (step S510). Formats and functions of the PSC request frame and PSC response frame exchanged in this case are the same as those described in the embodiment of FIG. 2. That is, the STA2 507 may report to the PCP 500 that the STA2 507 intends to enter the PS mode, and may also transmit its wakeup schedule by using the PSC request frame. Upon receiving the PSC response frame as an acknowledgement response from the PCP 500, the STA2 507 may enter the PS mode.

In this case, an STA1 505 intending to transmit a data frame to the STA2 507 exchanges an information request frame and an information response frame to obtain a wakeup schedule of the STA2 507 (step S520). Formats and functions of the information request frame and information response frame exchanged in this case are the same as those described in the embodiment of FIG. 4.

Upon recognizing the wakeup schedule of the STA2 507, the STA1 505 transmits a traffic indication message to the STA2 507 to report that the STA1 505 has a frame to be transmitted (step S530).

Upon receiving the traffic indication message, the STA2 507 receives the frame in the active mode (step S540). Alternatively, instead of entering the doze state, the STA2 507 remains in the awake state in the PS mode and thus waits to receive a frame to be transmitted later by the STA1 505. Thereafter, the STA1 505 transmits a data frame to the STA2 507 remaining in the awake state (in the active mode or the PS mode) (steps S550 and S560). In this case, a Pwr Mgt bit included in a frame control field of a MAC header of the transmitted data frame may be set to either 0 or 1 when the data frame is transmitted. Herein, the MAC header format and a detailed function of the Pwr Mgt bit may be found in the clauses 7.1.2 and 7.1.3.1 of IEEE Std 802.11™-2007 (Revision of IEEE Std 802.11-1999) document introduced in Jun. 12, 2007.

When the STA1 505 intends to report that the STA1 505 will enter the PS mode, the STA1 505 may transmit the data frame by setting the Pwr Mgt bit to 1. When the STA1 505 intends to report that the STA1 505 will operate in the active mode, the STA1 505 may transmit the data frame by setting the Pwr Mgt bit to 0.

When the STA1 505 transmits to the STA2 507 the data frame in which the Pwr Mgt bit is set to 1 (step S560), the STA1 505 can enter the PS mode after completing the transmission (step S570).

Thereafter, when the STA2 507 intends to change a power management mode or modify a wakeup schedule, the PSC request frame may be transmitted to the PCP 500 (step S580). The PCP 500 may transmit a non-requested information response frame to the STA1 505 irrespective of the request of the STA1 505 in order to report the modification of the wakeup schedule of the STA2 507 to the STA1 505 (step S590).

Meanwhile, one or more contention based periods (CBPs) may be present in one beacon interval. An ad-hoc traffic indication message (ATIM) window may exist in a first CBP, and may begin from a start of the first CBP. Herein, the ATIM window is a specific period defined by an ATIM window parameter included in a beacon frame. An ATIM frame and a control frame have to be transmitted only during the ATIM window. Details of the ATIM window parameter and the ATIM frame may be found in the clauses 7.3.27 and 7.2.3.2 of IEEE Std 802.11™-2007 (Revision of IEEE Std 802.11-1999) document introduced in Jun. 12, 2007.

An mSTA operating in the PS mode has to operate in the awake state during an ATIM window in an A-BI.

A MAC service data unit (MSDU) of which a recipient address is set to a group address and an MSDU which is transmitted for a power-conserving STA that can operate in the PS mode are first reported by using an ATIM frame during the ATIM window. The STA operating in the PS mode has to listen a report received using the ATIM frame in order to determine whether the STA needs to remain in the awake state. If no report is received during the ATIM window, the mSTA operating in the PS mode in the CBP may enter the doze state at the end of the ATIM window.

If the STA receives a directed ATIM frame during the ATIM window, the STA has to transmit an acknowledgement response for the reception of the ATIM frame and maintain the awake state to receive an MSDU to be transmitted to the STA. If the STA transmits the ATIM frame during the ATIM window and does not receive the ATIM frame from another STA, the STA may transmit an MPDU in which a PM bit is set to 1 to another STA receiving the ATIM frame transmitted from the STA.

Figure 6:
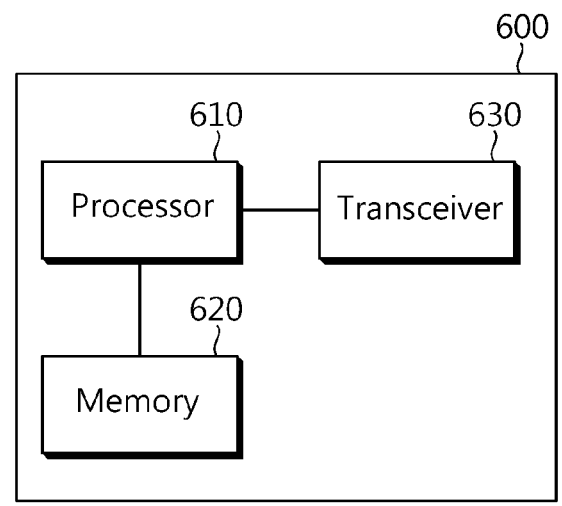
FIG. 6 is a block diagram showing a wireless apparatus for implementing an embodiment of the present invention.

FIG. 6 is a block diagram showing a wireless apparatus for implementing an embodiment of the present invention. A wireless apparatus 600 may be an AP, a PCP, or a non-AP/non-PCP STA.

The wireless apparatus 600 includes a processor 610, a memory 620, and a transceiver 630. The transceiver 630 transmits/receives a radio signal, and implements an IEEE 802.11 physical layer. The processor 610 is coupled to the transceiver 630, and implements an IEEE 802.11 MAC layer. When the processor 610 processes an operation of the AP/PCP in the aforementioned methods, the wireless apparatus 600 is the AP/PCP. When the processor 610 processes an operation of the non-AP/non-PCP in the aforementioned methods, the wireless apparatus 600 is the non-AP/non-PCP. The processor 610 and the transceiver 630 may include an application-specific integrated circuit (ASIC), a separate chipset, a logic circuit, and/or a data processing unit. The memory 620 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 620 and may be performed by the processor 610. The memory 620 may be located inside or outside the processor 610, and may be coupled to the processor 610 by using various well-known means.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

The invention claimed is:

1. A method in a wireless local area network, the method performed by an access point (AP) that functions as a personal basic service set control point (PCP) and comprising:
    receiving, by the AP from a second station, an information request frame for requesting whether or not a wakeup schedule is established between the AP and a first station, the information request frame including a target address indicating an address of the first station;
    transmitting, by the AP to the second station, an information response frame including a first wakeup schedule element in response to the information request frame,
    wherein, if the AP has an established wakeup schedule with the first station, the first wakeup schedule element includes information about the establish wakeup schedule, and
    wherein, if the AP has no established wakeup schedule with the first station, a length of the first wakeup schedule element is set to zero by the AP; and
    transmitting, by the AP to the second station, an unsolicited information response frame when the AP updates the first station's wakeup schedule with an updated schedule for the first station, the unsolicited information response frame including a second wakeup schedule element including information about the updated wakeup schedule of the first station.

2. The method of claim 1, wherein the first wakeup schedule element includes a start time field and a sleep interval field, the start time field indicating a start time offset of a next awake beacon interval, the sleep interval field indicating a time between two successive awake beacon intervals.

3. The method of claim 2, wherein the awake beacon interval is defined as a beacon interval during which the first station is in the awake state for a period of time.

4. A device for an access point (AP) of a wireless local area network, the device comprising:
    a transceiver, and
    a processor operably coupled with the transceiver and configured to:
        instruct the transceiver to receive, from a second station, an information request frame for requesting whether or not a wakeup schedule is established between the AP and a first station, the information request frame including a target address indicating an address of the first station;

instruct the transceiver to transmit, to the second station, an information response frame including a first wakeup schedule element in response to the information request frame, wherein, if the device has an established wakeup schedule with the first station, the first wakeup schedule element includes information about the establish wakeup schedule, and wherein, if the AP has no established wakeup schedule with the first station, a length of the first wakeup schedule element is set to zero by the AP; and instruct the transceiver to transmit, to the second station, an unsolicited information response frame when the device updates the first station's wakeup schedule with an updated schedule for the first station, the unsolicited information response frame including a second wakeup schedule element including information about the updated wakeup schedule of the first station.

5. The device of claim 4, wherein the first wakeup schedule element includes a start time field and a sleep interval field, the start time field indicating a start time offset of a next awake beacon interval, the sleep interval field indicating a time between two successive awake beacon intervals.

6. The device of claim 5, wherein the awake beacon interval is defined as a beacon interval during which the first station is in the awake state for a period of time.

* * * * *